US006003891A

United States Patent [19]

Broadhead

[11] Patent Number: 6,003,891

[45] Date of Patent: Dec. 21, 1999

[54] TILT WHEELCHAIR WITH CENTER OF GRAVITY COMPENSATION

[75] Inventor: Douglas Broadhead, Brampton, Canada

[73] Assignee: Invacare Corporation, Elyria, Ohio

[21] Appl. No.: 08/747,359

[22] Filed: Nov. 12, 1996

[51] Int. Cl.[6] .................... B60N 2/12

[52] U.S. Cl. .................... 280/304.1; 180/907; 297/329; 297/330

[58] Field of Search .................... 280/304.1; 180/328, 180/326, 907; 297/322, 329, 340, 344.1, DIG. 7, DIG. 10, 341, 330, 344.11, 344.14, 344.17, 344.2

[56] References Cited

U.S. PATENT DOCUMENTS

| | | | |
|---|---|---|---|
| Re. 28,210 | 10/1974 | Re | 290/329 |
| 1,756,807 | 4/1930 | Black et al. | 297/329 |
| 2,920,684 | 1/1960 | Fante et al. | 297/329 |
| 4,186,904 | 2/1980 | Reinmoller et al. | 297/329 |
| 4,678,231 | 7/1987 | Chizek | 297/329 |
| 5,044,647 | 9/1991 | Patterson . | |
| 5,292,144 | 3/1994 | Sosnoff | 280/304.1 |
| 5,297,021 | 3/1994 | Koerlin et al. | 180/907 |

FOREIGN PATENT DOCUMENTS

| | | |
|---|---|---|
| WO 94/07452 | 4/1994 | WIPO . |
| WO 96/19374 | 6/1996 | WIPO . |

OTHER PUBLICATIONS

"Action Arrow & Torque Storm Series" Catalog, 1995.

*Primary Examiner*—Anne Marie Boehler
*Attorney, Agent, or Firm*—Hudak & Shunk Co., L.P.A.

[57] ABSTRACT

A wheelchair incorporates a tilt mechanism with a center of gravity compensation by employing a rotary actuator. The actuator is secured to the underside of the seat and has an arm pivotally secured to the frame. A seat pivot axis is located on a movable member that allows the axis to shift from a rear portion of the wheelchair toward a front portion as the seat is tilted from its upright position to a tilted position. This assures that the center of gravity of the user is maintained within the wheelbase of the chair, i.e., compensates for center of gravity.

6 Claims, 4 Drawing Sheets

TILT WHEELCHAIR WITH CENTER OF GRAVITY COMPENSATION

BACKGROUND OF THE INVENTION

This invention pertains to the art of wheelchairs and, more particularly, to a wheelchair in which the seat can tilt relative to the frame, i.e., the entire seat moves from an upright to a tilted position, and the weight of the user is repositioned to maintain the center of gravity at a stable location between the ground engaging wheels.

The invention is particularly applicable to a power chair and will be described with reference thereto. However, it will be appreciated that the invention has broader applications and may be advantageously employed in related environments and applications.

Known seating systems for wheelchairs allow the entire seat to pivot about a fixed point. Typically, the seating system is actuated via a linear actuator where the seat portion and seat back pivot or tilt as a unit about the fixed pivot point in response to extension and retraction of the linear actuator. Although adequate for some circumstances, it is desired to maintain the center of gravity of the user at substantially the same location whether in an upright or tilted position. The position of the center of gravity is not addressed with the fixed pivot arrangement of the prior art.

A compact, reliable actuator is also desired to provide for durable, yet repeatable performance. Preferably, the actuator should be mounted at a location that is easily secured to the seat assembly and frame, is accessible to a controller, and does not take up a large amount of space.

One known patent that describes a tilting wheelchair arrangement is shown in U.S. Pat. No. 5,044,647. The '647 patent has a tilt/recline wheelchair with a center of gravity compensation. Particularly, a pair of stanchions are secured to horizontal side members at their junction with a vertical support member. A pair of cam follower pins provided on upper ends of the stanchions cooperate with arcuate slots disposed in cam plates mounted at the joint between the seat back and seat portion. A lower end of the cam plate is secured to a seat support bar slidable along a pair of guide rails. As a linear actuator pulls the seat support bar, the seat then tilts from an upright position to a tilted position, the pin providing for the cammed arcuate movement and center of gravity compensation during the tilting process.

Although the '647 patent does maintain the center of gravity of the user between the front and rear wheels of the wheelchair, the tilt mechanism is relatively large and cumbersome. Thus, a simple, economical, and compact tilt mechanism that compensates for the center of gravity is desired.

SUMMARY OF THE INVENTION

The present invention contemplates a new and improved tilt mechanism particularly useful in a power wheelchair that overcomes all of the above-referenced problems and others.

In accordance with the present invention, there is provided a tilt mechanism interposed between the seat and frame for changing the position of the seat. The tilt mechanism includes a rotary actuator and a guide assembly defining a generally linear path along which a seat pivot axis travels during tilting.

According to another aspect of the invention, the rotary actuator includes first and second arms that selectively pivot relative to one another, outer ends of each being pivotally secured to the frame and seat, respectively.

According to yet another aspect of the invention, the guide assembly is oriented in a substantially horizontal plane so that the fore-to-aft weight distribution of the user, i.e. center of gravity compensation, is maintained within the wheel base in both the upright and tilted positions.

A principal advantage of the invention is a tilt mechanism that provides for or compensates for center of gravity.

Yet another advantage of the invention resides in the compact mechanism that provides for the tilt operation.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
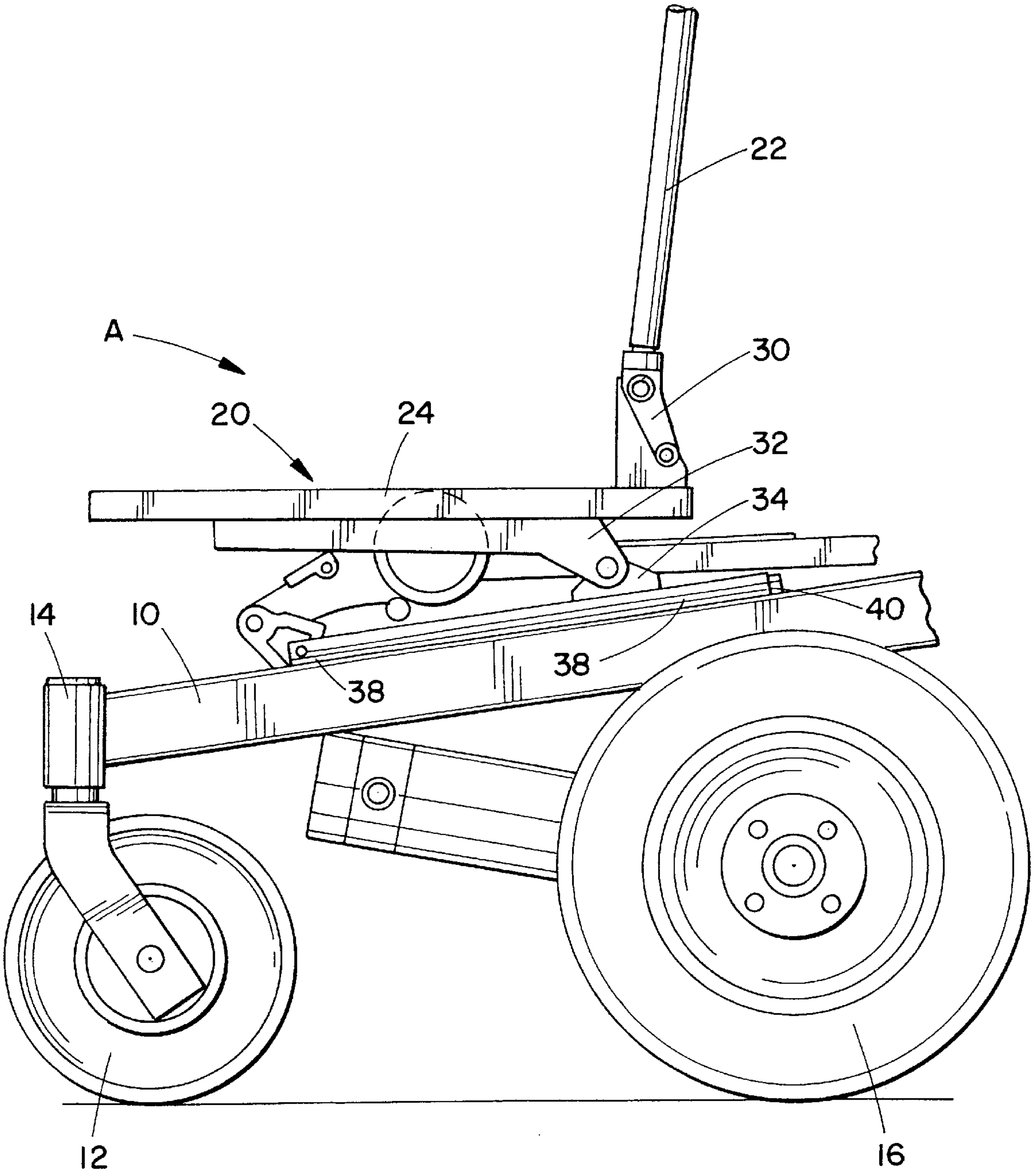
FIG. 1 is a side elevational view of a wheelchair, with portions of the seat removed, showing the seat in a generally upright position.

Referring now to the drawings wherein the showings are for the purposes of illustrating the preferred embodiment of the invention only and not for purposes of limiting same, the FIGURES show a wheelchair A, typically a power wheelchair where enlarged rear wheels are powered by on-board batteries and front wheels steer the wheelchair in response to the driving force applied to the rear wheels. Examples of the power chair and various features that may be provided therewith are shown and described in assignee's catalog Form No. 94-27 Rev. 10/95 of Invacare Corporation directed to the Action Arrow® and Torque Storm Series™ power chairs, details of which are incorporated herein by reference. The catalog discloses state of the art power wheelchairs to which the subject invention may apply, although it will be understood by one of ordinary skill in the art that this invention may be used in conjunction with other wheelchairs.

Figure 2:
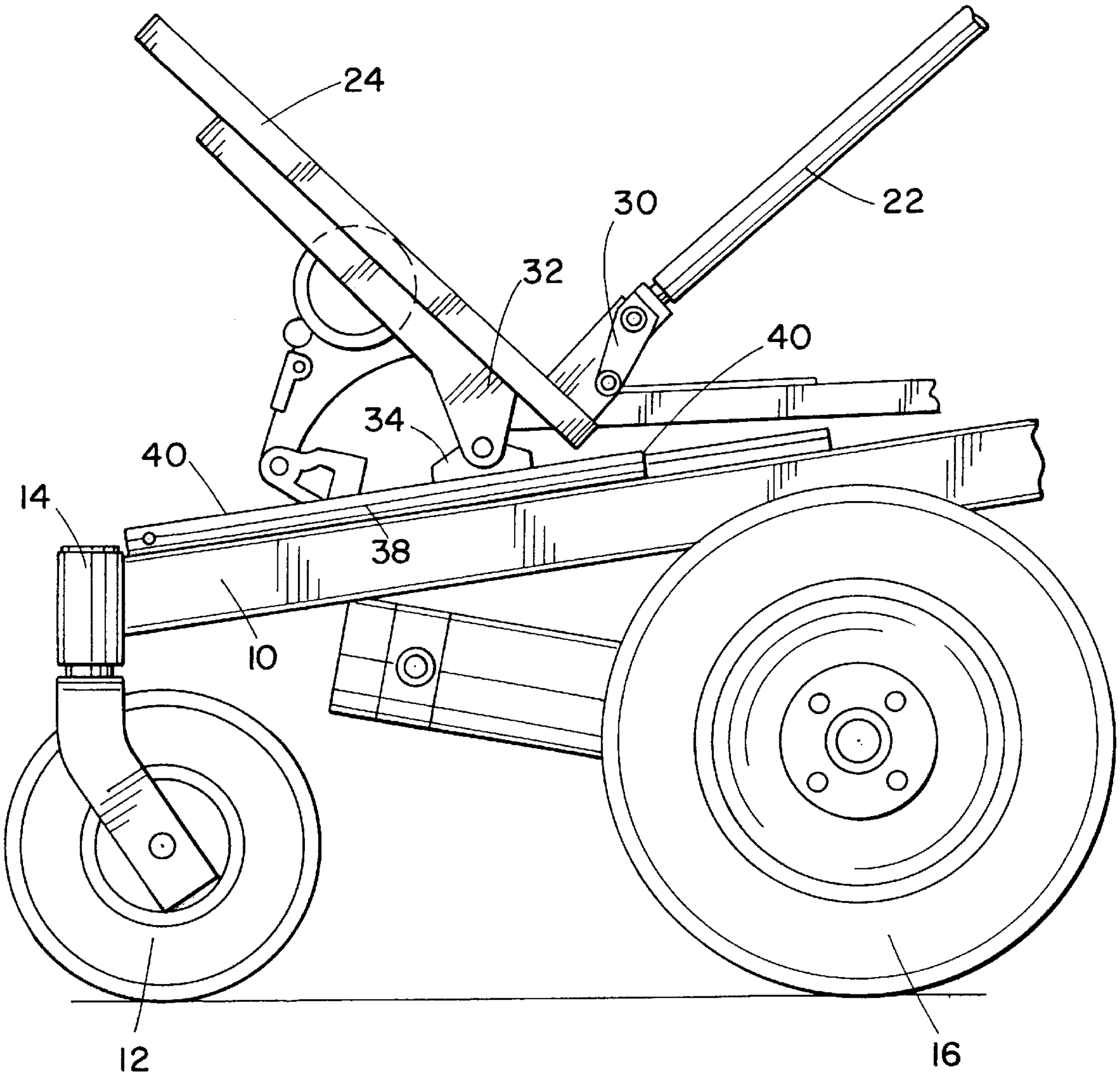
FIG. 2 is a side elevational view similar to FIG. 1 with the seat shown in a tilted position.

Turning more particularly to FIGS. 1 and 2, the wheelchair includes a frame 10, typically formed from a strong, lightweight material that resists bending forces. A preferred frame is an aluminum construction having rectangular cross-sectional shapes that provide a durable, tough frame assembly. The frame includes a series of frame components that are secured together, for example by welding, to provide a simple, yet effective frame on which the wheelchair components may be easily mounted. In the preferred embodiment, a pair of small diameter pneumatic wheels 12 are mounted via a caster assembly 14 to a front portion of the frame. The caster mounting allows the front wheels to freely rotate about a vertical axis in response to a driving force imposed by the rear wheels 16. As shown, the rear wheels are preferably a larger diameter pneumatic tire than the front wheels and the rear axles are disposed adjacent a rear portion of the frame. As briefly indicated above, the frame carries a power supply (not shown), such as one or more rechargeable batteries that power a pair of drive motors 18 that provide an extended range before recharging is required.

Removably secured to the frame is a seat 20. The seat includes a seat back 22 and a seat portion 24. The support structures of the seat back and seat portion are shown in FIGS. 1 and 2, the upholstery having been removed for ease of illustration. Preferably, the seat support structure is also formed of rectangular crosssectional tubing for strength purposes to which the upholstery can be easily secured. A first pair of flanges or gussets 30 extends upwardly from a rear end of the seat portion, typically being rigidly secured thereto by welding or the like. The gussets receive lower ends of the support structure that defines the seat back 22. As will be understood, the seat back may be fixed in its angular relationship to the seat portion 24, or it may incorporate a recline feature where the seat back can pivot independently of the seat portion for user comfort. Again, the recline feature is an option that may be used with the inventive tilt arrangement to be described below.

A second pair of flanges 32 is rigidly secured to the support structure of the seat portion and extends downwardly and rearwardly toward the frame. The flanges 32 include openings that receive a seat pivot axis defined by pin members 34 that allow the seat to pivot or tilt as a unit relative to the frame. The pin member 34 also extends through openings provided in mounting members 38 extending upwardly from the frame. According to the preferred arrangement, the members 38 are slidable relative to the frame, being received in longitudinal guide members 40. The guide members are preferably rigidly secured to the frame and allow the members 38 to freely advance forwardly and rearwardly along the frame. A comparison of FIGS. 1 and 2 illustrate how the mounting members 38 and guide members 40 (together defining a guide assembly) provided on opposite sides of the seat are advanced toward the front end of the frame when the seat is pivoted from an upright position (FIG. 1) to a tilted position (FIG. 2).

In the preferred embodiment, the slide member 38 and the guide member 40 which is secured to the frame are defined by cooperating channels or key and keyway members. Moreover, the guide assembly operates without substantially altering the vertical height of the seat pivot axis between the upright and tilted positions. Of course different structural arrangements that allow the seat pivot axis 34 to move relative to the frame, and compensate for the changing center of gravity by preferably maintaining it within the wheelbase, can be used without departing from the scope and intent of the subject invention.

Figure 3:
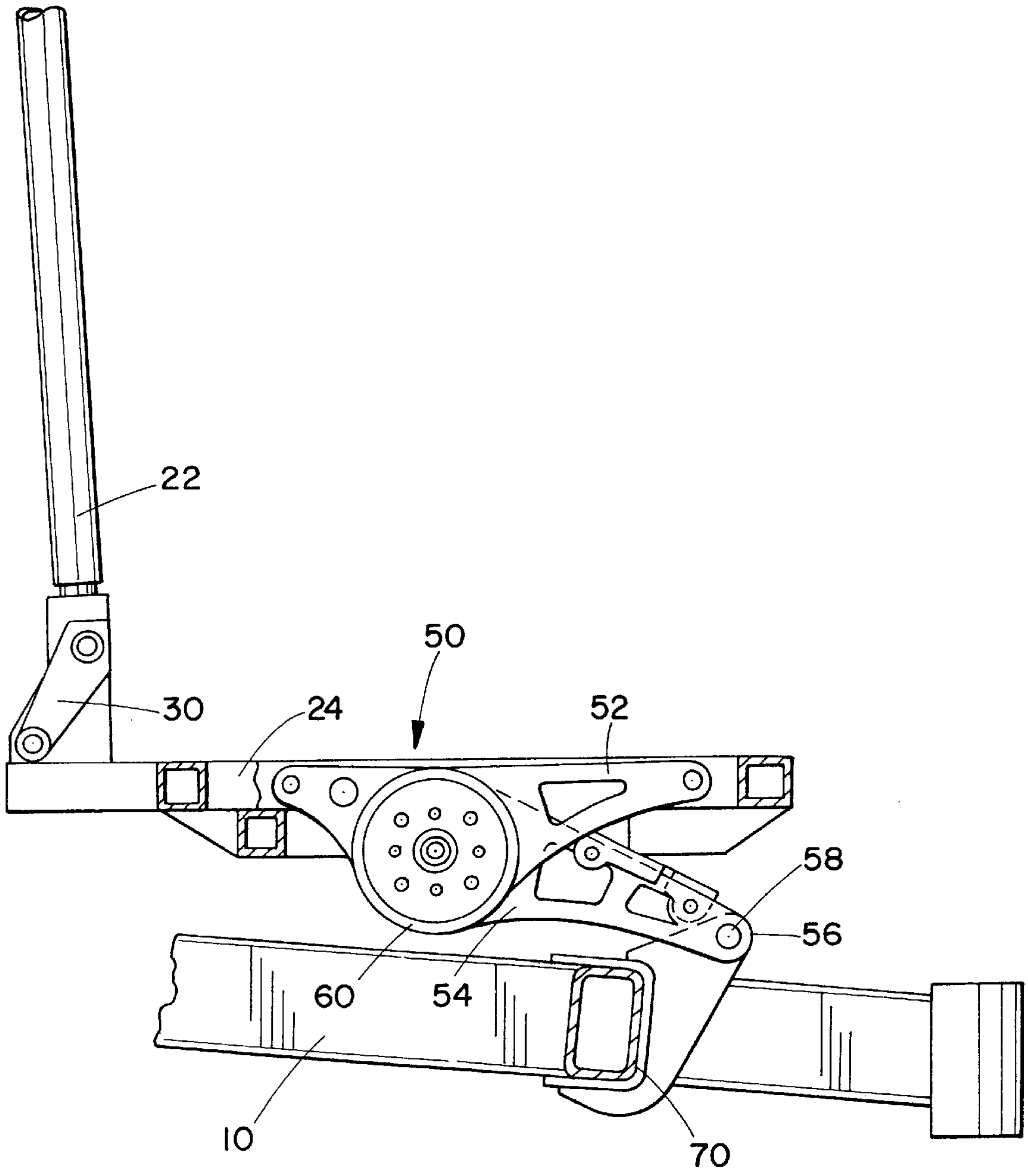
FIG. 3 is a schematic representation of the components of the rotary actuator pivotally secured to the seat and frame.
Figure 4:
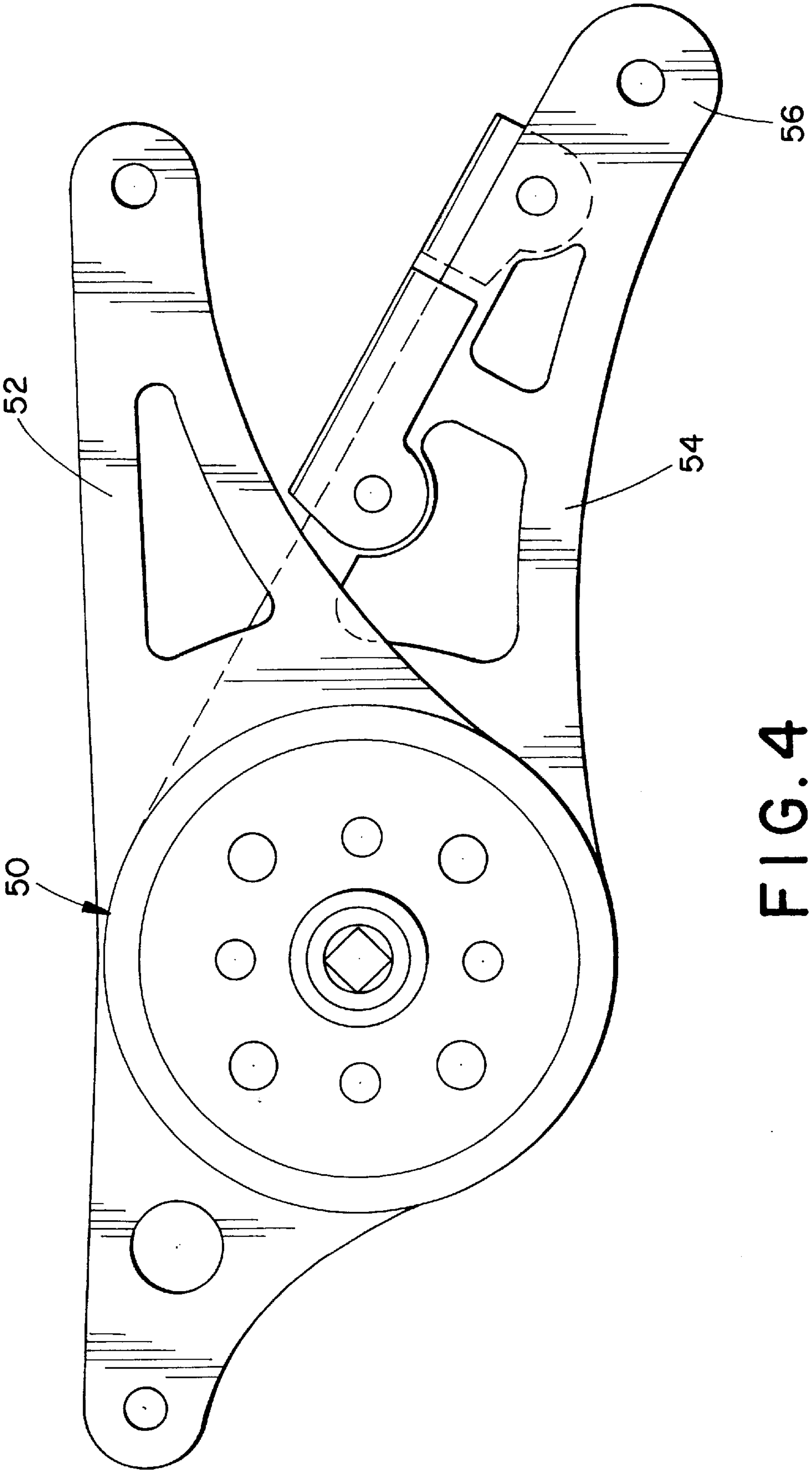
FIG. 4 is an enlarged elevational view of the rotary actuator used in the subject invention.

With continued reference to FIGS. 1 and 2, and additional reference to FIGS. 3 and 4, the rotary actuator 50 will be described in greater detail. The actuator is preferably a rotary actuator driven by a motor (not shown) in which two arms or links 52, 54 extend outwardly from the actuator body. The angular relationship between the arms is selectively varied to provide the tilting action of the seat. Specifically, the first arm 52 is secured to the support structure of the seat portion. The second arm 54, on the other hand, is pivotally secured at an outer end 56 by pin member 58 to the frame. Inner or second ends of the first and second arms rotate or pivot relative to one another about a generally common axis. Thus, as the planetary gears of the rotary actuator are driven by the motor, the angle between the first and second links 52, 54 varies to selectively move the seat between the upright and tilted positions.

The first end 56 of the second link is pivotally secured to the frame, preferably along a cross member 70 thereof. The actuator body, and thus the seat portion of the seat, are pulled forwardly as the angle between the arms increase. Thus, as the entire seat tilts, the pin member 34 is advanced forwardly toward the front portion of the frame, i.e., the member 38 is pulled forwardly along the guide member 40 as the angle increases between the first and second links 52, 54. A comparison of FIGS. 1 and 2 illustrates that the rotary actuator tilts the seat through an angle of approximately forty-five degrees. Of course, by controlling the extent of rotation of the actuator, the links may be maintained at an infinite number of angular positions between the extreme upright and tilted positions. This allows for comfort of the user, and the user can easily select the desired tilted position of the seat. It will also be recognized that the range of tilt need not be limited to forty-five degrees but that other ranges, either greater or lesser, can be used without departing from the invention.

The rotary actuator is desired because it provides a compact, reliable tilt actuator that easily fits within the dimensional constraints beneath the seat. A conventional power chair can be easily converted to a power tilt arrangement by securing the first arm of the rotary actuator to the underside of the seat portion, pivotally securing the end of the second link to the frame, and modifying the frame with the guide assembly defined by movable member 38 and guide member 40. In contrast to the prior art arrangement where the pivot is fixed during the tilting process, it will be recognized that the seat pivot axis 34 is disposed more closely adjacent the rear wheels in the upright position (FIG. 1) and more closely adjacent the front wheels in the tilted position (FIG. 2). This relationship assures that the center of gravity of the user is maintained over the wheel base without adding undue complexity and components to the wheelchair.

Although presently contemplated for use with a power chair, the subject power tilt arrangement can be incorporated into a manual chair. The manual chair would have to be modified to include a power supply, such as a small battery and motor to drive the tilt actuator, but such a modification is easily within the scope and intent of the subject invention.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A wheelchair which is capable of supporting the weight of a user to define a center of gravity comprising:

a frame;

ground engaging wheels operatively associated with the frame for providing mobility;

a seat connected to said frame by a bracket which forms a first link at a fixed position relative to said seat portion and by a second link pivotally connected to said frame, said first and second links defining an angle there between; and having a seat portion and a seat back; and a tilt mechanism for changing the position of the seat relative to the frame, the tilt mechanism including a guide member operatively associated with the seat portion defining a generally linear path along which a pivot axis of the seat travels relative to the frame and a power rotary actuator for pivoting the seat about the pivot axis between generally upright and tilted positions relative to the frame such that the weight of the user is repositioned to substantially maintain the center of gravity relative to the ground engaging wheel wherein at least a portion of said first link and at least a portion of said second link extend radially outward from said rotary actuator which acts upon the first and second links to change the angle there between to tilt the seat.

2. The wheelchair as defined in claim 1 wherein the first link has a first arm having a first end secured to the seat portion and the second link has a second arm having a first end pivotally secured to the frame, second ends of the first and second arms being rotatable about a common axis.

3. The wheelchair as defined in claim 2 wherein the seat is pivotally secured to the guide member about a pivot member so that the seat can tilt about the pivot member as it travels linearly along the guide member.

4. The wheelchair as defined in claim 3 wherein the seat can tilt over a range of approximately forty-five degrees.

5. The wheelchair as defined in claim 3 wherein the seat portion is connected to the pivot member at a location adjacent the seat back.

6. The wheelchair as defined in claim 1 wherein the guide member is oriented in a substantially horizontal plane so that the fore-to-aft weight distribution of the user is substantially the same in the upright and tilted positions.

* * * * *